(12) United States Patent
Seremet

(10) Patent No.: US 10,099,878 B1
(45) Date of Patent: Oct. 16, 2018

(54) MEDIA INFEED METAL DETECTION

(71) Applicant: NCR Corporation, Duluth, GA (US)

(72) Inventor: Slavko Seremet, Kitchener (CA)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 15/337,369

(22) Filed: Oct. 28, 2016

(51) Int. Cl.
*B65H 7/06* (2006.01)
*B65H 5/06* (2006.01)
*G01V 3/08* (2006.01)

(52) U.S. Cl.
CPC .......... *B65H 7/06* (2013.01); *B65H 5/06* (2013.01); *G01V 3/08* (2013.01); *B65H 2553/24* (2013.01)

(58) Field of Classification Search
CPC ... B65H 7/00; B65H 7/02; B65H 7/06; B65H 7/18; B65H 7/20; B65H 43/00; B65H 2301/423; B65H 2407/30; B65H 2511/416; B65H 2515/714; B65H 2515/708; B65H 2553/24; G01V 3/08
See application file for complete search history.

(56) References Cited

U.S. PATENT DOCUMENTS

| 9,598,252 | B1* | 3/2017 | Middleton | B65H 5/062 |
|---|---|---|---|---|
| 2004/0130337 | A1* | 7/2004 | Clark | G01V 3/02 |
| | | | | 324/693 |
| 2014/0028301 | A1* | 1/2014 | Hahl | G01V 3/08 |
| | | | | 324/234 |
| 2014/0159503 | A1* | 6/2014 | Murakami | H01F 38/14 |
| | | | | 307/104 |
| 2016/0122144 | A1* | 5/2016 | Fukumoto | B65H 1/12 |
| | | | | 271/12 |
| 2016/0304305 | A1* | 10/2016 | Link | B65H 7/06 |
| 2016/0341843 | A1* | 11/2016 | Hull | G01V 3/08 |
| 2017/0073179 | A1* | 3/2017 | Uno | B65H 7/125 |
| 2017/0113891 | A1* | 4/2017 | Middleton | B65H 7/02 |

* cited by examiner

*Primary Examiner* — David H Bollinger
(74) *Attorney, Agent, or Firm* — Schwegman, Lundberg & Woessner

(57) ABSTRACT

Baseline values for metal detection readings associated with an item inserted into an infeed mouth of a depository are obtained before the item is pinched on a pathway of the depository. The baseline values are adjusted by additional readings obtained when the item is pinched on the pathway for transport. The adjusted baseline values are processed with calculated values from ongoing and fluctuating current readings to determine at least one final value. A determination is made as to whether the item includes at least some metal based on comparison of the at least one final value and a predefined value.

18 Claims, 5 Drawing Sheets

MEDIA INFEED METAL DETECTION

BACKGROUND

Media handing devices that process media documents and bunches of media documents after separating the media documents for individual processing downstream within the media handling devices. Media handing devices include a variety of integrated components.

As the media document is processed through the media handling device, a variety of sensors are activated and deactivated to track movement of the media document and indicate where the media document is located along the transport pathway. These sensors include image sensors for taking different image characteristics of the media document and other sensors for other purposes.

One such other sensor, is a metal detection sensor located in an infeed module of the media handling device. This sensor is configured to detect metal that may have inadvertently been included within a bunch of media documents inserted through the infeed mouth of the media handling device. Metal (e.g., coins, paperclips, staples, wires, etc.), which is present in a bunch of media documents, can be very problematic for other componentry of the media handling device, causing such componentry to: malfunction, jam, suspend a current transaction, and place the media handling device in a condition where it is unusable until serviced by a technician (offline).

Existing metal detection processing is too sensitive to noise conditions that do not indicate the presence of metal in the bunch of media documents, but rather, incorrectly detects existing variances for metal comprised in the existing componentry of the media handling device as being metal. When noise is improperly identified as metal, an existing transaction may be suspended and support staff needs to physically attend to the media handling device to bring it back online for service.

Moreover, existing metal detection processing often misses small pieces of metal embedded between documents in a bunch. This too is problematic because the undetected metal can jam and even permanently damage downstream componentry; thereby, necessitating replacement parts and creating an unreasonable period of time during which the media handling device is unavailable for customer use.

Therefore, there is a need for improved accuracy for metal detection at the infeed portion of media handling devices.

SUMMARY

In various embodiments, methods and an infeed module of a valuable media depository are provided for metal detection processing.

According to an embodiment, a method for metal detection processing within an infeed module of a valuable media depository is presented. Specifically, and in one embodiment, pre-pinch metal detection readings are obtained when an item is inserted into an infeed mouth of a depository. The pre-pinch metal detection readings are adjusted when the item is pinched within the depository to establish adjusted baseline readings. Metal detection values are calculated based on the adjusted baseline readings and variations in ongoing metal detection readings. Finally, a determination is made as to whether at least some metal is associated with the item based on comparison of the metal detection values to at least one predefined value.

DETAILED DESCRIPTION

Figure 1A:
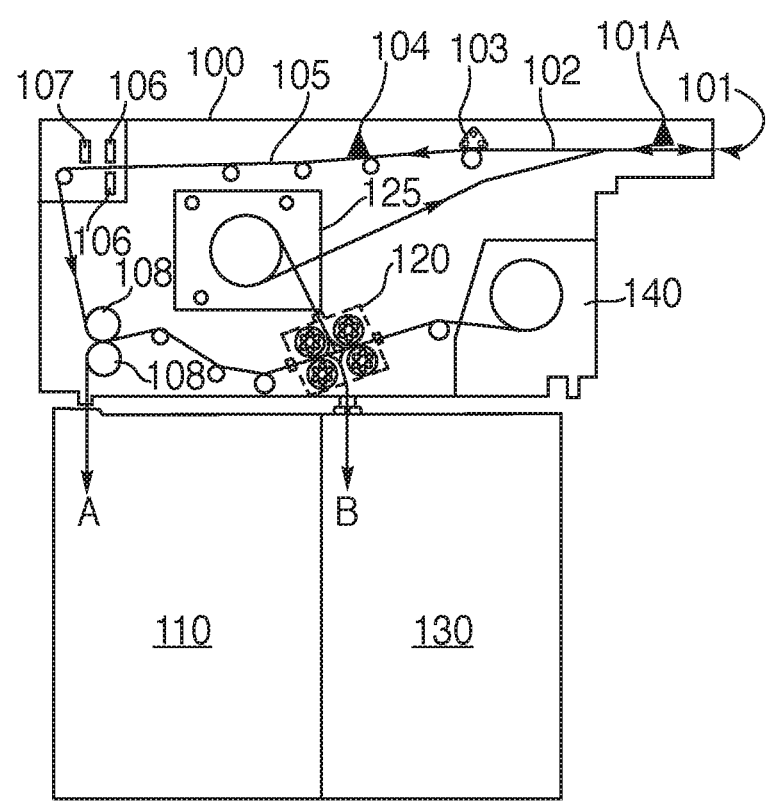
FIG. 1A is a diagram depicting a deposit module of a Self-Service Terminal (SST) having an infeed module, according to an example embodiment.

FIG. 1A is a diagram depicting a one-sided view of a valuable media depository 100, according to an example embodiment (also referred to as a deposit module). It is to be noted that the valuable media depository is shown with only those components relevant to understanding what has been added and modified to a conventional depository for purposes of providing metal detection processing within an infeed module 101A integrated within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A novel infeed module 101A (described in greater detail in the FIGS. 1B and 2-4 herein and below) accepts or rejects (dispenses back) a bunch of received items (valuable media). Thus, a bunch (stack) of one or more items (valuable media) is input or output. Accepted incoming checks and/or banknotes follow a first transport path 102 away from the mouth 101 and infeed module 101A in a substantially horizontal direction from right to left shown in the FIG. 1A. They then pass through a novel separator module 103 and from the separator 103 to a deskew module 104 along another pathway portion 105, which is also substantially horizontal and right to left. The items are now de-skewed and aligned for reading by imaging cameras 106 and a Magnetic Ink Character Recognition (MICR) reader 107.

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks (a type of valuable media/document) and/or banknotes (another type of valuable media/document) to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

Figure 2:
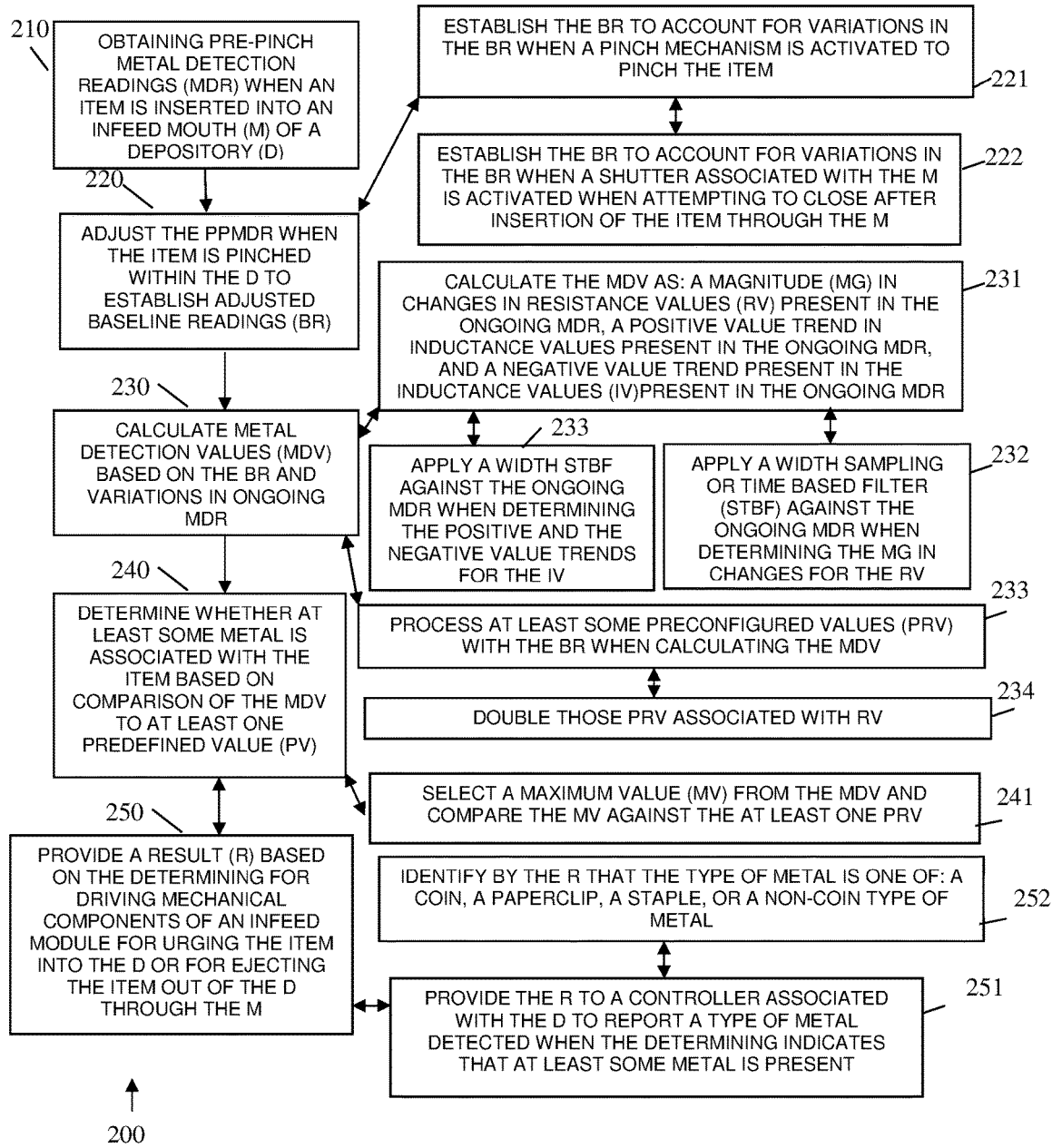
FIG. 2 is a diagram of a method metal detection, according to an example embodiment.
Figure 3:
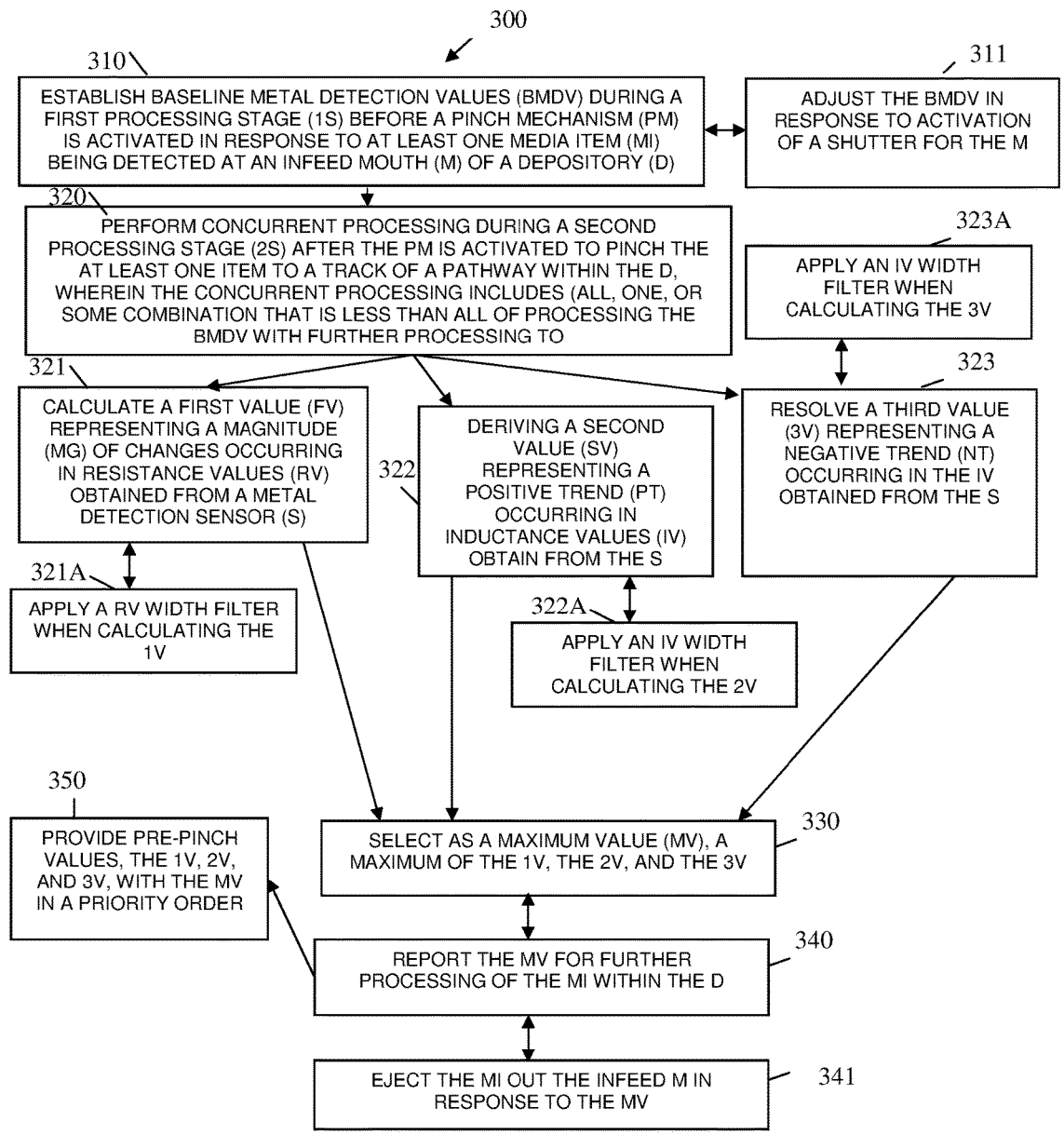
FIG. 3 is a diagram of another method for metal detection, according to an example embodiment.

For purposes of the discussions that follow with respect to the FIGS. 1A and 2-3, "valuable media" is referred to as currency (currency note and/or check) and the "valuable media depository" is referred to as a "depository." Additionally, valuable media may be referred to as a "document" and/or "media document" herein.

Figure 1B:
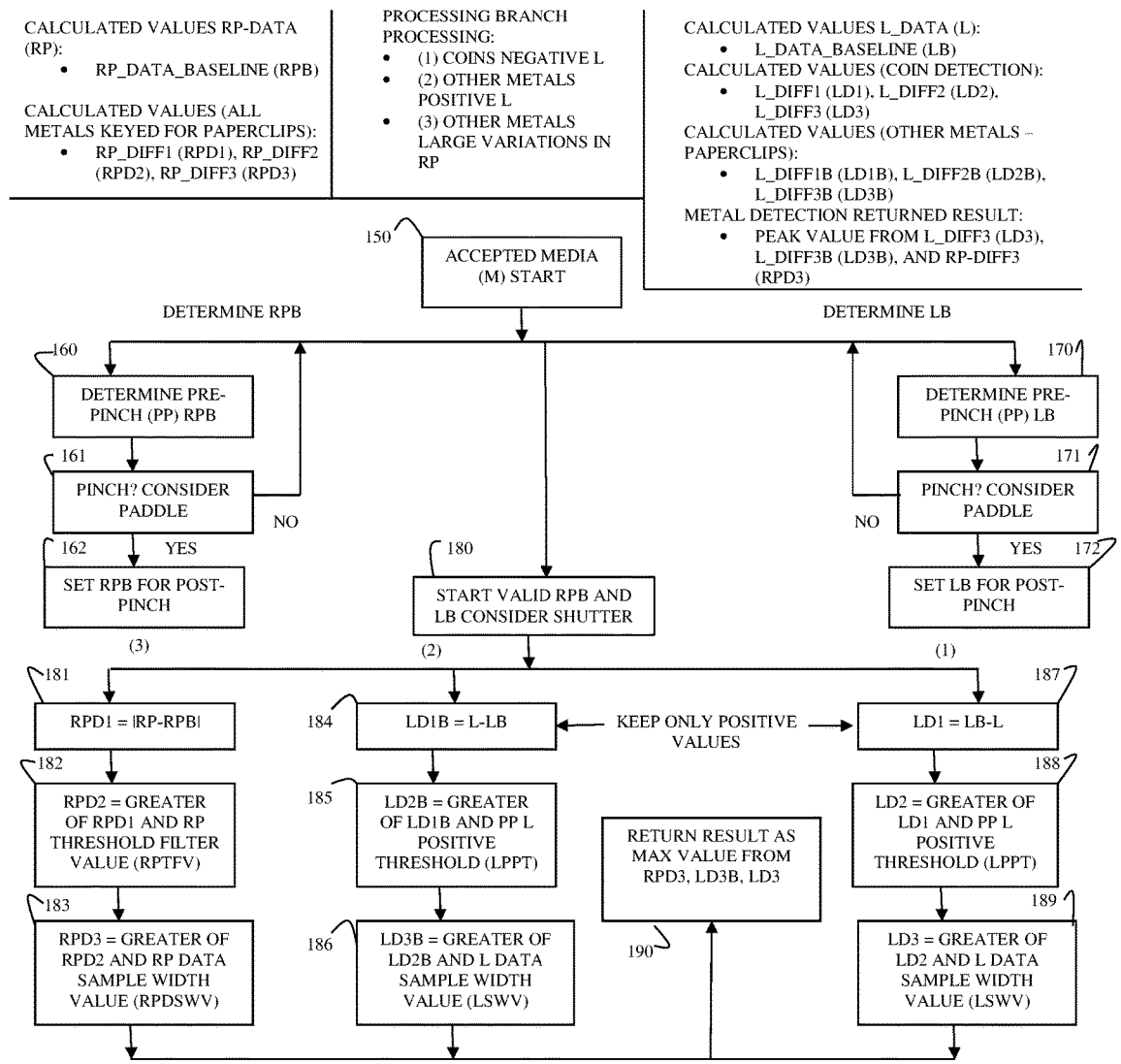
FIG. 1B is a diagram depicting processing within an infeed module for metal detection, according to an example embodiment.

FIG. 1B is a diagram depicting processing within an infeed module 101A for metal detection, according to an example embodiment.

The infeed module is interface to or receives readings of values from a metal detection integrated circuit board having a metal sensor. Typically, these sensor includes a coil that is connected to a driver board and conducts a signal in response to the presence of metal in proximity to the coil (induction and/or resistance). These sensors are known in the industry and provide a variety of known data, such as LDC1101® high-speed high-resolution inductance-to-digital converter metal sensor circuitry distributed by Texas Instruments®. The sensor-coil boards are integrated into the depository's infeed module circuit board. Moreover, many in the industry integrated their own proprietary sensor-coil boards into their infeed module circuit boards.

These sensor-circuit boards provide raw L data (inductance data) and RP data (resistance data) readings in the presence of metal based on the proximity of any metal to the sensors (coils). The values and ranges of values for the raw L data and the RP data are known in the industry. Moreover, the digitally converted readings are provided in a known format (such as in specific bits or byte ranges). The integrated controller associated with the infeed module is typically programmed to control the infeed electromechanical components based on the raw L and RP values provided in the known digital formats from the metal sensor circuit boards. For example, a known reading may cause the infeed integrated controller to reject a bunch of media items provided through the infeed mouth causing the electromechanical componentry of the infeed module to reverse the bunch and eject the bunch out the infeed mouth.

The detailed processing reflected in the FIG. 1B is programmed in the firmware/software of an infeed module or in an external controller that controls the infeed electromechanical components. The processing relies on raw L and RP readings communicated from a single metal sensor circuit board or a plurality of metal sensor circuit boards.

It is noted that the metal sensors can be very sensitive instruments, such that noise can be detected as raw L and RP data that cause the controller of the infeed module 101A to believe that metal is present in the infeed mount. This noise can be detected even when the depository 100 is not actively been used for a deposit transaction, such as when something bumps into the depository 100. Temperatures for an external environment in which the depository 100 is operated and internal temperatures of the of the componentry of the depository 100 can also generate noise. Other sources that can generate noise include stepper motors, or any other source of electromagnetic fields present within the depository 100. Particularly, any stepper motor located within the infeed module 101A or in close proximity to the metal sensor circuit board can generate a decent amount of electromagnetic noise detected by the metal sensor circuit board.

Combinations of raw L data and raw RP data can form digital signatures for the presence or non-presence of metal within the infeed module 101A.

In addition, the metal detection circuit continuously provides readings for the L and RP data. This data is available pre-pinch (before the infeed module's paddle or clamps have pressed against a bunch of documents) and post-pinch (after the infeed module's paddle or clamps have pressed against and secure the bunch for transport along the pathway 102.

The processing for detecting metal and distinguishing between legitimate metal presence and false noise within the infeed module 101A is now discussed with reference to the FIG. 1B. The processing is part of or a subcomponent of the infeed controller associated with controlling the infeed electromechanical components. Therefore, the processing as discussed herein and below is referred to as the infeed controller (firmware/software).

A variety of parameter values are configurable and provided through settings to the infeed controller. Some of these parameter values include: pre-pinch L data negative metal threshold value, pre-pinch L data positive metal threshold, L data width filter, post-pinch L data negative metal threshold, post-pitch L data negative metal threshold, RP data width filter, pre-pinch RP threshold value (absolute value), post-pinch RP threshold (absolute value).

The L data values calculated by the infeed controller are identified in the upper-right corner of the FIG. 1B and include calculations for: a L data baseline value (LB), a L data first difference value (LD1), a L data second difference value (LD2), a L data third difference value (LD3); and for non-coin based metal detection: a L data first B difference value (LD1B), a L data second B difference value (LD2B), and a L data difference third value (LD3B).

The upper-right corner of the FIG. 1B also identifies what is returned from the infeed controller processing that drives other infeed processing by the infeed controller. This includes a peak value selected from the calculated LD3, LD3B, and RPD3 (discussed below).

The upper-left corner of the FIG. 1B identifies RP data values calculated by the infeed controller, which includes: a RP data baseline value (RPB), a RP data first difference value (RPD1), a RP data second difference value (RPD2), and a RP data third difference value (RPD3).

The processing is comprised of two zones: a first zone for pre-pinch L data and RP data and a second zone for post-pinch L data and RP data. The processing is measuring how far the L data goes negative and positive from the first zone to the second zone and the magnitude of change with respect to the L data width filter. Moreover, the processing is measuring absolute change (differential) that the RP changes for the RP width filter from the first zone to the second zone.

The processing assumes that something was detected as having entered the infeed mouth 101, which initiates, at 150, the infeed controller to start metal detection processing. The L data and RP data values are obtained from the metal detection sensor circuit, at 150. The infeed controller knows when the infeed paddle has pinched and not pinched on the bunch of media items inserted through the infeed mouth 101; therefore, the L data and RP data are data obtained before the paddle has pinched against the bunch 160 and 170. As the paddle is pinched against the bunch the L data and RP data changes as a result of movement in the paddle and accounted for at 161 and 171. That is, the variation in the pre-pinch L data and RP data from the pre-pinch to the post-pinch allows for the LB and RPB to be noted accurately at 162 and 172. This processing reduces the likelihood of noise created simply by the paddle moving from a non-pinched position to a pinched position.

At 180, the infeed controller notes L data and RP data received from the metal detection circuit as the shutter of the infeed mouth 101 moves or is activated to being closing, post-pinch. That is, comparing against a newly determined baseline each time the shutter opens is how temperature variation is eliminated as a source of noise. So, the raw baseline level is not as significant as the difference from the initial baseline.

The infeed controller three primary branches in processing (each of which may be performed in parallel with one another) as identified in the top-middle of the FIG. 1B as: (1) detection of coins based on negative going (trending) L data; (2) detection of other metals (such as paper clips) based on positive going (trending) L data; and (3) detection of other metals based on large variations in RP data. Each branch of processing is labeled in the FIG. 1B as (1) beginning at 187, (2) beginning at 184, and (3) beginning at 181. Again, the three branches of processing can be performed in parallel and simultaneously with one another. In addition, some branches of processing can be excluded, such that just a single branch is processed, or just two branches are processed in parallel with one another. For example, a foil detection based approach configured in the infeed controller, the branch (3) may be excluded since foil is known to affect just RP data and not the L data.

Beginning with the third branch (3), at 181, the RPD1 is calculated as the absolute value of the difference between the current RP data less the RPB (|RP−RPB|. Next, at 182, the RPD2 is calculated as the greater of the RPD1 value and the RP threshold metal value (passed parameter to the infeed controller). The processing at 182 represents a threshold filter. Finally, at 183, the RPD3 is calculated as the greater of RPD2 and RP data sampled width value (sampled or time based RP data and the RP data width filter for sampling provided as a parameter). The final calculated RPD3 indicates that metal is present when RPD3 is greater than zero; this determination is based on the determination with this processing branch that there is a large or significant magnitude changes appearing in the raw RP data.

At the concurrent second branch (2), at 184, the LD1B is calculated as the difference between the current L data less LB (LD1B−LB), here only positive values are kept. Next, at 185, the LD2B is calculated as the greater of the LD1B and the post-pinch positive metal threshold (passed as a parameter to the infeed controller; this represents a threshold filter. Finally, at 186, the LD3B is calculated as the greater of the LD2B and L data sampled width value (sampled or time based L data width filter for sampling provided as a parameter). The final calculated LD3B indicates that a non-coin but other type of metal, such as a paperclip, is present when the LD3B is greater than zero; this is based on the determination with this processing branch that there is a positive trend (going) appearing in the raw L data.

At another concurrent third branch (3), at 187, the LD1 is calculated as the different between the LB less the current L data (LB-L), here only positive values are kept. Next, at 188, the LD2 is calculated as the greater of the LD1 and the pre-pinch L negative threshold (passed as a parameter); this represents a threshold filter. Finally, at 189, the LD3 is calculated as the greater of L data sampled width value (sample or time based L data width filter for sampling provided as a parameter). The final calculated LD3 indicates that a coin or coin-type of metal is present when LD3 is greater than zero; this determination is based on the determination with this processing branch that there is a negative trend (going) appearing in the raw L data.

The calculated RPD3, LD3B, and LD3 is received at 190 and the maximum value of the three is returned to the higher level infeed controller processing where additional processing may or may not be driven by the retuned value, such as ejecting the bunch of items, or allowing the bunch of items to proceed along the pathway 102 to other downstream components of the depository 100.

The processing continues until the shutter of the infeed 101 completely closes (as indicated by other processing available to the infeed controller).

In an embodiment, the maximum value returned from the three calculated values can be processed to identify the type of metal detected in the infeed module 101A, such that should the bunch be unable to be ejected, a service technician can be appropriately prepared to deal with the type of metal detected.

These and other embodiments are now discussed with reference to the FIGS. 2-4.

FIG. 2 is a diagram of a method 200 metal detection, according to an example embodiment. The method 200 when processed controls operation for an infeed module integrated into a valuable media depository. The method 200 is implemented as executable instructions representing one or more firmware/software modules referred to as an "infeed controller." The instructions reside in a non-transitory computer-readable medium and are executed by one or more processors of the infeed module and/or valuable media depository.

In an embodiment, the valuable media depository is the depository 100 of the FIG. 1A.

In an embodiment, the valuable media depository is a recycler module.

In an embodiment, the valuable media depository is a peripheral device integrated into a Self-Service Terminal (SST). In an embodiment, the SST is an ATM. In an embodiment, the SST is a kiosk.

In an embodiment, the valuable media depository is a peripheral device integrated into a Point-Of-Sale (POS) terminal operated by a clerk.

In an embodiment, the infeed controller is implemented within the infeed module 101A of the FIGS. 1A-1B.

In an embodiment, the infeed controller performs the processing depicted in the FIG. 1B.

In an embodiment, the infeed controller is executed as firmware programmed instructions in memory of an infeed module or an integrated control circuit of a media depository.

At 210, the infeed controller obtains pre-pinch metal detection readings when an item is inserted into an infeed mouth 101 of a valuable media depository 100. The item can be a single media document (check, note, etc.) or the item can be a bunch of media documents. The infeed module continually obtaining resistance and inductance metal readings from a metal detection sensor/circuit situated in the depository 100 adjacent or proximate to the infeed mouth 101.

At 220, the infeed controller adjusts the pre-pinch metal detection readings when the item is pinched (post-pinch) by a pinching (or clamping) mechanism within the depository 100 for purposes of establishing adjusted baseline readings. The adjusted baseline readings account for inductance and resistance values that are changed when the pinching mechanism is activated/moving and changes again when the item is finally pinched along a track of pathway 102 within the depository 100.

Thus, in an embodiment, at 221, the infeed controller establishes the adjusted baseline readings to account for variations that occur when the pinch mechanism is activated to pinch the item and variations once the item is pinched by the pinching mechanism.

In an embodiment of 221 and at 222, the infeed controller establishes the adjusted baseline readings to account for variations in the adjusted baseline readings when a shutter associated with the infeed mouth 101 when the shutter is attempting and begins to close after insertion of the item through the infeed mouth 101.

At 230, the infeed controller calculates metal detection values based on the fully adjusted baseline values and variations (and trends) appearing in ongoing metal detection readings being obtained from the infeed controller from the metal detection sensor/circuit.

According to an embodiment, at 231, the infeed controller calculates the metal detection values as: 1) a magnitude in changes in resistance values presenting in the ongoing metal detection readings (the processing branch (3) in the FIG. 1B for non-coin metals having large variations in RP data), 2) a positive value trend (going) in inductance values appearing in the ongoing metal detection values (the processing branch (2) in the FIG. 1B for paperclip type metals and non-coin metals with positive trending L data), and 3) a negative value trend (going) in the inductance values appearing in the ongoing metal detection values (the processing branch (1) in the FIG. 1B for detecting coin-type metals with negative trending L data).

In an embodiment of 231 and at 232, the infeed controller applies a width sampling or time-based filter against the ongoing metal detection readings when determining the magnitude in the changes for the resistance values provided in the ongoing metal detection readings.

In an embodiment of 231 and at 233, the infeed controller applies a width sampling or time-based filter against the ongoing metal detection readings when determining both the negative and positive trends in the inductance values provided in the ongoing metal detection readings.

In an embodiment, at 233, the infeed controller processes at least some preconfigured values with the adjusted baseline readings when calculation the metal detection values. A sample of these predefined or parameter-based values were provided above with the description of the FIG. 1B.

In an embodiment, the predefined values (thresholds) that are associated with the resistance values are doubled. This is done to improve the ranges provided in the thresholds for resistance-based values (RP data).

At 240, the infeed controller determines whether at least some metal is associated with the item based on comparison of the metal detection values to at least one predefined value. In an embodiment, the predefined value is 0 (as presented in the FIG. 1B).

In an embodiment, at 241, the infeed controller selects a maximum value from the metal detection values and compares that maximum value against the at least one predefined value. This is selection of the maximum value from the results of the three branches of processing discussed in the FIG. 1B and the processing identified at 190.

According to an embodiment, at 250, the infeed controller provides a result based on the processing of 240 for driving components of an infeed module 101A and for urging the item into the depository 100 or for ejection the item out of the depository 100 through the infeed mouth 101.

In an embodiment of 250 and at 251, the infeed controller provides the result to a controller associated with the depository 100 to report a type of metal detected when the processing at 240 indicates that at least some metal is present and associated with the item.

In an embodiment of 251 and at 252, the infeed controller identifies by the result that the type of metal is one of: a coin, a paperclip, a staple, and/or a non-coin type of metal.

In an embodiment, the infeed controller provides pre-pinch and post-pinch calculated values in a priority order with the result. The pre-pinch values include negative L data, positive L data, and RP data all pre-pinch. The post-pinch data includes the negative L data, positive L data, and the RP data all post-pinch. The priority order is based on a highest to lowest value with highest being most likely to be detection of metal.

FIG. 3 is a diagram of another method 300 for metal detection, according to an example embodiment. The method 300 when processed controls operation for an infeed module integrated into a valuable media depository. The method 200 is implemented as executable instructions representing one or more firmware/software modules referred to as an "metal detector." The instructions reside in a non-transitory computer-readable medium and are executed by one or more processors of the valuable media depository.

In an embodiment, the valuable media depository is the depository 100 of the FIGS. 1A-1B.

In an embodiment, the valuable media depository is a recycler module.

In an embodiment, the valuable media depository is a peripheral device integrated into a Self-Service Terminal (SST). In an embodiment, the SST is an ATM. In an embodiment, the SST is a kiosk.

In an embodiment, the valuable media depository is a peripheral device integrated into a Point-Of-Sale (POS) terminal operated by a clerk.

In an embodiment, the metal detector is executed as firmware programmed instructions in memory of an infeed module and/or an integrated circuit of a valuable media depository.

In an embodiment, the metal detector performs, inter alia, the processing discussed above with the FIGS. 1B and 2.

At 310, the metal detector establishes baseline metal detection values during a first processing stage or zone (processing 150-172 of the FIG. 1B) and before a pinching mechanism is activated in response to at least one media item being detected at an infeed mouth 101 of a depository 100. The baseline metal detection values also accounting for movement and pinch of the item within the depository 100.

According to an embodiment, at 311, the metal detector further adjusts the baseline metal detection values in response to activation and movement of the shutter for the infeed mouth 101 that may begin to close behind the item.

At 320, the metal detector performs concurrent processing during a second stage of zone (processing 181-189 (post-pinch of item) and described more completely in the FIG. 1B) after the pinching mechanism is activated and has pinched the at least one media item to a track of a pathway 102 within the depository. The concurrent processing performed by the metal detector includes all, one, or some combination that is less than all of the processing 321-323 (described below) and includes usage of the adjusted baseline metal detection readings.

At 321, the metal detector calculates a first value designed to represent a magnitude of changes occurring in resistance values obtained from a metal detection sensor/circuit. This is the processing 181-183 of the FIG. 1B.

In an embodiment of 321 and at 321A, the metal detector applies a resistance value width filter (data sampled or time sampled) when calculating the first value.

At 322, the metal detector derives a second value represent a positive trend (going) occurring in inductance values obtained from the metal detection sensor/circuit. This is the processing 184-186 of the FIG. 1B.

In an embodiment of 322 and at 322A, the metal detector applies an inductance value width filter (data sampled or time sampled) when calculating the second value.

At 323, the metal detector resolves a third value representing a negative trend (going) in the inductance values obtained from the metal detection sensor/circuit. This is the processing 187-189 of the FIG. 1B.

In an embodiment of 323 and at 323A, the metal detector applies an inductance value width filter (data sampled or time sampled) when calculating the second value.

When the concurrent processing finishes, the first, second, and third values are known and fed to 330, where the metal detector selects a maximum value from the first, second, and third values.

At 340, the metal detector reports the maximum value for further processing of the at least one item within the depository 100. The processing 330 and 340 represent the processing 190 of the FIG. 1B.

According to an embodiment of 340 and at 341, the metal detector causes ejection of the at least one media item out of the infeed mouth 101 in response to a maximum value indicating that metal is present or believed to be present with the at least one media item. In the FIG. 1B, this would be where the maximum value is greater than 0 where 0 or less indicates that metal is unlikely to be present with the at least one media item, such that in this scenario the metal detector would cause the at least one media time to be urged further along the pathway 102 for downstream processing by other components of the depository 100. In another case, when any metal is detected the metal detector causes all belts within the depository to stop and the customer is given a chance to pull the media item back out the infeed mouth 101 before any ejection processing by reversing the belts is caused to be initiated by the metal detector.

According to an embodiment, at 350, the metal detector provides pre-pinch calculated values, the first, second, and third values along with the maximum value in a priority order. The priority is determined based on any value being identified as a potential metal. The pre-pinch values include the negative L value, the positive L value, and the RP value.

Figure 4:
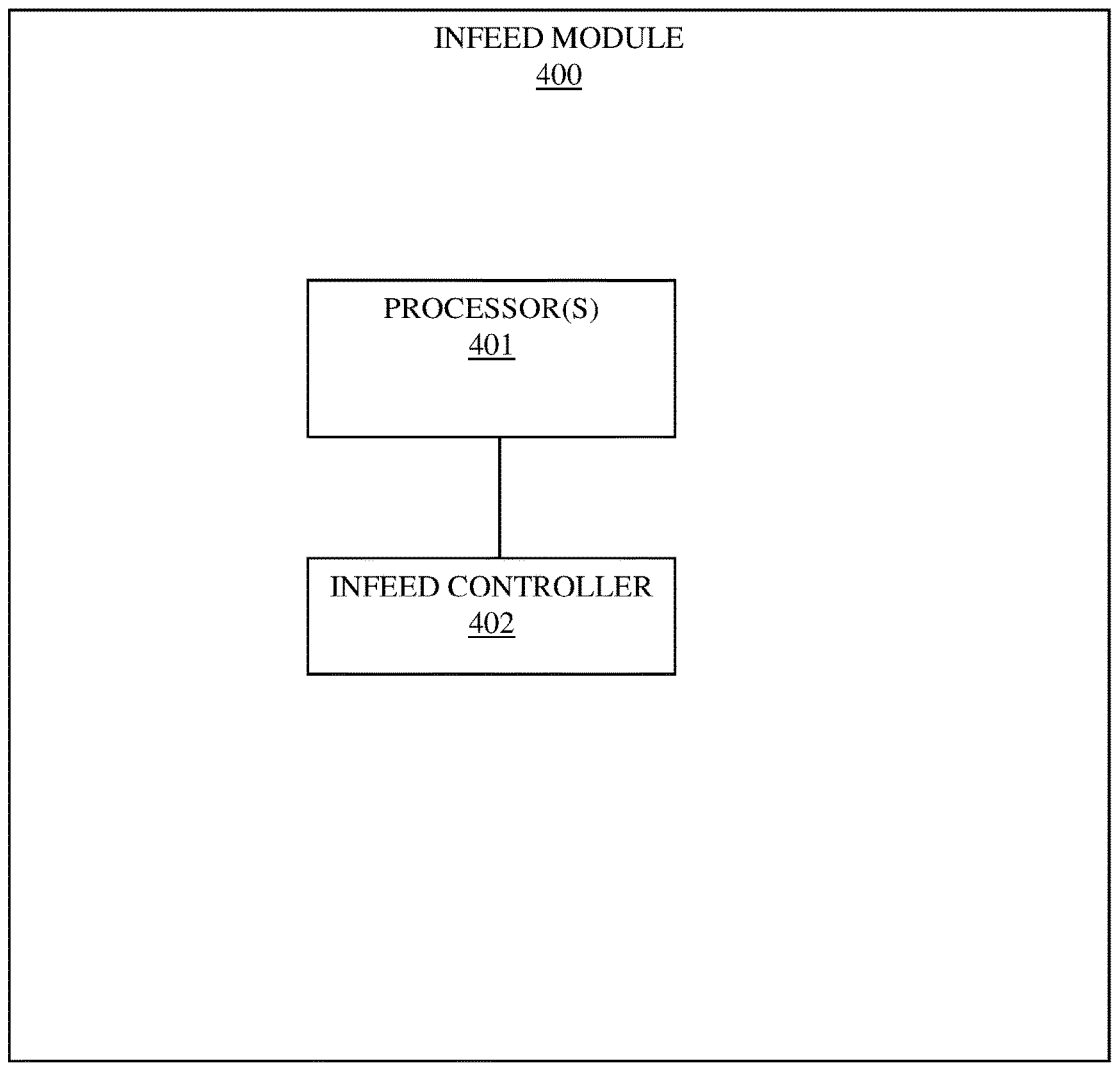
FIG. 4 is a diagram of an infeed module within a valuable media depository, according to an example embodiment.

FIG. 4 is a diagram of an infeed module 400 within a valuable media depository, according to an example embodiment. infeed module 400 includes a variety of mechanical, electrical, and programmed software/firmware components, some of which were discussed above with reference to the FIGS. 1A-1B and the FIGS. 2-3.

In an embodiment, the infeed module 400 is any of or some combination of the infeed modules discussed above with reference to the FIGS. 1A-1B and 2-3.

The infeed module 400 includes one or more processors 401 and an infeed controller 402. The infeed controller 402 includes one or more integrated metal-sensor circuit boards.

The infeed controller 402 is configured to: i) execute on the processor 401, ii) establish baseline metal detection readings before a pre-pinch mechanism is activated to pinch at least one media item presented at an infeed mouth of a media depository against a track of a pathway for the media depository, iii) calculate a maximum metal detection value based on the baseline metal detection readings, preconfigured threshold values, and ongoing variations in resistance and inductance values provided by a metal detection sensor, and iv) determine based on the maximum metal detection value whether: a) to urge the at least one media item along the pathway, b) stop transportation of the at least one media item within the depository 100; or c) eject the at least one media item back out the infeed mouth.

In an embodiment, the valuable media depository that includes the infeed module 400 is one of: a SST an ATM, and a POS terminal.

In an embodiment, the infeed controller 402 performs any combination of or all the processing discussed above with the FIGS. 1B and 2-3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining pre-pinch metal detection readings when an item is inserted into an infeed mouth of a depository;
    adjusting the pre-pinch metal detection readings when the item is pinched within the depository to establish adjusted baseline readings;
    calculating metal detection values based on the adjusted baseline readings and variations in ongoing metal detection readings; and
    determining whether at least some metal is associated with the item based on comparison of the metal detection values to at least one predefined value.

2. The method of claim 1 further comprising, providing a result based on the determining for driving mechanical components of an infeed module for urging the item into the depository or for ejecting the item out of the depository through the infeed mouth.

3. The method of claim 2 further comprising providing the result to a controller associated with the depository to report a type of metal detected when the determining indicates that at least some metal is present.

4. The method of claim 3, wherein providing further includes identifying by the result that the type of metal is one of: a coin, a paperclip, a staple, or a non-coin type of metal.

5. The method of claim 1, wherein adjusting further includes establishing the adjusted baseline readings to account for variations in the adjusted baseline readings when a pinch mechanism is activated to pinch the item.

6. The method of claim 5, wherein adjusting further includes establishing the adjusted baseline readings to account for variations in the adjusted baseline readings when a shutter associated with the infeed mouth is activated when attempting to close after insertion of the item through the infeed mouth.

7. The method of claim 1, wherein calculating further includes calculating the metal detection values as: a magnitude in changes in resistance values present in the ongoing metal detection readings, a positive value trend in inductance values present in the ongoing metal detection readings, and a negative value trend present in the inductance values present in the ongoing metal detection readings.

8. The method of claim 7, wherein calculating further applying a width sampling or time based filter against the ongoing metal detection readings when determining the magnitude in changes for the resistance values.

9. The method of claim 7, calculating further applying a width sampling or time based filter against the ongoing metal detection readings when determining the positive and the negative value trends for the inductance values.

10. The method of claim 1, wherein calculating further includes processing at least some preconfigured values with the adjusted baseline readings when calculating the metal detection values.

11. The method of claim 10, wherein processing further includes doubling those preconfigured values associated with metal detection resistance values.

12. The method of claim 1, wherein determining further includes selecting a maximum value from the metal detection values and comparing the maximum value against the at least one predefined value.

13. A method, comprising:
(i) establishing baseline metal detection values during a first processing stage before a pinch mechanism is activated in response to at least one media item being detected at an infeed mouth of a depository;
(ii) performing concurrent processing during a second processing stage after the pinch mechanism is activated to pinch the at least one item to a track of a pathway within the depository, wherein the concurrent processing includes processing the baseline metal detection values with further processing for:
(a) calculating a first value representing a magnitude of changes occurring in resistance values obtained from a metal detection sensor;
(b) deriving a second value representing a positive trend occurring in inductance values obtain from the metal detection sensor; and
(c) resolving a third value representing a negative trend occurring in the inductance values obtained from the metal detection sensor;
(iii) selecting as a maximum value, a maximum of the first value, the second value, and the third value; and
(iv) reporting the maximum value for further processing of the at least one media item within the depository.

14. The method of claim 13 further comprising, (v) providing pre-pinch values, the first value, the second value, and the third value with the maximum value in a priority order.

15. The method of claim 13, wherein (ii)(a) further includes applying a resistance value width filter when calculating the first value.

16. The method of claim 13, wherein (ii)(b) further includes applying an inductance value width filter when calculating the second value.

17. The method of claim 13, wherein (ii)(c) further applying an inductance value width filter when calculating the third value.

18. The method of claim 13, wherein (iv) further includes ejecting the at least one media item out the infeed mouth in response to the maximum value.

\* \* \* \* \*